Oct. 31, 1961   R. F. BECKER   3,006,674
UNIVERSAL CONNECTOR
Filed Jan. 7, 1960
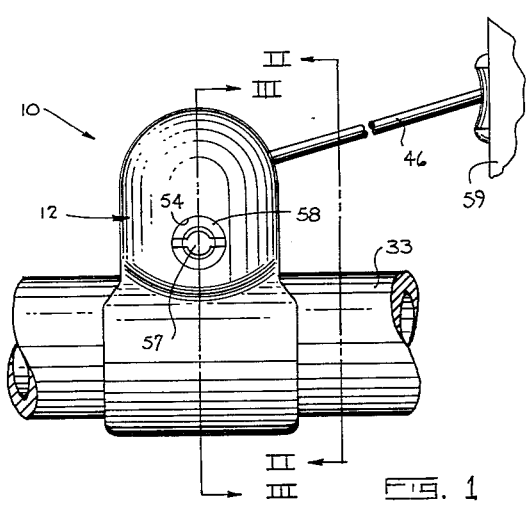
FIG. 1
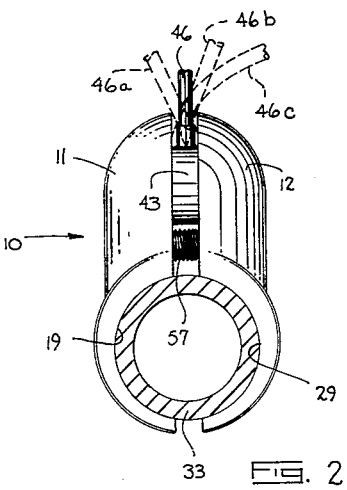
FIG. 2
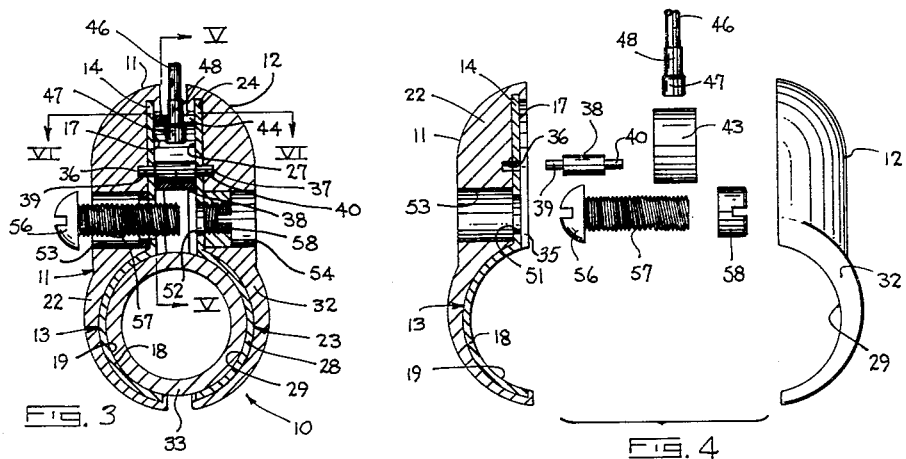
FIG. 3
FIG. 4
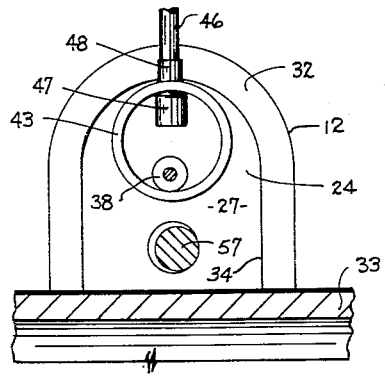
FIG. 5
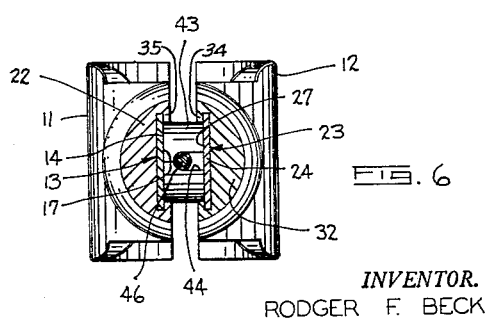
FIG. 6
INVENTOR.
RODGER F. BECKER
BY
Woodhams, Blanchard & Flynn
ATTORNEYS United States Patent Office 3,006,674
Patented Oct. 31, 1961

3,006,674
UNIVERSAL CONNECTOR
Rodger F. Becker, Kalamazoo, Mich., assignor to Aero-Motive Manufacturing Company, Kalamazoo, Mich., a corporation of Michigan
Filed Jan. 7, 1960, Ser. No. 1,111
6 Claims. (Cl. 287—92)

This invention relates in general to a device for effecting a universal connection between a pair of elongated elements and, more particularly, to a connector whereby one end of a cable can be pivotally and rotatably secured to a conduit between the ends thereof.

Many circumstances develop wherein it becomes desirable to connect a cable to a collapsible conduit, such as a rubber hose. For example, it is common practice to secure the end of a reel supported cable to the hose which is connected to a gasoline pump. The reel, which usually has a spring biased, cord supporting drum, is generally mounted within the gasoline pump and is arranged to assist in the support of at least part of the hose both during and after use. Although this particular use for a connector between a cable and a hose has long existed, previous connectors for this purpose have not been entirely satisfactory.

Heretofore, it has been customary to secure the cable to the hose by a connector which is substantially rigid in construction and which, at best, swivels or pivots around only one axis. As a result, it is not unusual for the connector and/or hose to be positioned so that the cable and/or hose is pinched, or so that a severe twist is applied to the connector and thereby transmitted at least in part to the hose, thereby effecting a distortion of the hose. That is, because of the inflexibility in the construction of existing connectors, the force applied to the connector by the cable often twists or distorts the hose so that it is difficult to handle and is sometimes even damaged.

Although the language of the following description may be directed primarily to a connection between a cable and a hose and, more particularly, to the connection between a retrieving cable and a gasoline hose, it will be recognized that the same problem exists in the connection between many different kinds of elongated elements, both flexible and inflexible. Thus, it will be understood that the specific reference made herein to the combination of a cable and a hose, such as a gasoline hose, is not intended to limit the scope of the invention.

Accordingly, a primary object of this invention has been the provision of a device for effecting a universal connection between one end of one elongated element, such as a cable, and an intermediate point on another elongated element, such as a hose.

A further object of this invention has been the provision of a universal connecting device, as aforesaid, which can be easily and quickly connected and disconnected between the cable and the hose, which is extremely simple to assemble and use, and which is sturdy in structure.

A further object of this invention has been the provision of a universal connector, as aforesaid, which can be easily adapted to various sizes of cables, hoses and other types of elongated elements, which is inexpensive to manufacture, which is spark proof to reduce fire hazards where it is used on a hose for a gasoline pump, which has a pleasing appearance when it is installed and is sufficiently small and compact that it does not interfere with the normal operation of the hose or the normal function of the cable between which it is connected.

Other objects and purposes of this invention will become apparent to persons familiar with this type of equipment upon reading the following specification and examining the accompanying drawings, in which:

FIGURE 1 is a side elevational view of a universal connector embodying the invention as applied to a connection between a hose and a cable.

FIGURE 2 is a sectional view taken along the line II—II in FIGURE 1, with the cable in a different position of operation.

FIGURE 3 is a sectional view taken along the line III—III in FIGURE 1 with parts thereof in different positions of operation.

FIGURE 4 is an exploded, partially sectioned view of said universal connector.

FIGURE 5 is a sectional view taken along the line V—V in FIGURE 3.

FIGURE 6 is a sectional view taken along the line VI—VI in FIGURE 2.

For convenience in description, the terms "upper," "lower," derivatives thereof and words of similar import will have reference to the universal connector and parts thereof, as appearing in FIGURES 1, 2 and 4. The words "inner," "outer," derivatives thereof and words of similar import will have reference to the geometric center of said universal connector and parts thereof.

*General description*

The objects and purposes of the invention, including those set forth above, have been met by providing a universal connector whereby an end of a first elongated element is both pivoted and swiveled with respect to a second elongated element between the ends thereof. The said universal connector is comprised of a pair of substantially identical clamping members, each of which has a planar surface adjacent to a concave surface, the concave surfaces being formed to engage and snugly embrace diametrically opposite sides of the second elongated element, such as a hose, between the ends thereof. Pivot mechanism is mounted between the planar surfaces of said members for swivelly engaging the end of the first element, which may be a cable. The two clamping members are removably held together by screw means, which extends through said planar surfaces.

*Detailed description*

The universal connector 10 (FIGURES 1 and 2), which has been selected to illustrate a preferred embodiment of the invention, is comprised of a pair of clamping members 11 and 12 which are preferably, but not necessarily, substantially identical. The clamping member 11 (FIGURES 3 and 4) consists of a substantially rigid metal strip 13 having a flat portion 14, defining a substantially planar surface 17, and an arcuate portion 18, defining an adjacent concave surface 19. The convex side of the arcuate portion 18 and the corresponding side of the flat portion 14, as well as their peripheral edges, are preferably coated with, or imbedded in, a resiliently flexible material 22, such as rubber.

The clamping member 12 consists of a metal strip 23 having a flat portion 24, defining a planar surface 27, and an arcuate portion 28, defining a concave surface 29. The back and edge surfaces of the metal strip 23 are coated with, or imbedded in, a resiliently flexible backing material 32, such as rubber. The backing material 32 which extends around the peripheral edges of the flat portion 24 projects perpendicularly from said flat portion toward the corresponding portion of the clamping member 11. Thus, a U-shaped flange 34 (FIGURE 5) is formed by the projecting material around the free edges of the flat portion 24. A similar flange 35 (FIGURES 4 and 6) is formed around the flat portion 14 on member 11 by the backing material 22 thereon.

The members 11 and 12 are preferably constructed so that the planar surfaces 17 and 27 are substantially parallel with, and spaced a selected distance from, each other when the concave surfaces 19 and 29 snugly embrace diametrically opposite sides of the hose 33, which they are designed to engage.

Corresponding parts of the flat portions 14 and 24 (FIGURE 3) have openings therethrough defining the open ends of the recesses 36 and 37, which extend into the adjacent portions of the resilient backing material 22 and 32, respectively. A cylindrical pivot pin 38 is disposed between the planar surfaces 17 and 27 and has at its opposite ends coaxial portions 39 and 40 of reduced diameter which are snugly and slidably received into the recesses 36 and 37.

A substantially cylindrical collar 43 (FIGURES 4 and 5) has an inside diameter substantially larger than the outside diameter of the pivot pin 38, which it encircles. The collar 43 is axially shorter than the central portion of the pivot pin 38 so that said collar is substantially free to rotate around the pivot pin 38 when the end portions 39 and 40 thereof are properly disposed in the recesses 36 and 37, respectively. The collar 43 has an axially disposed slot 44 which extends from one axial end thereof to a point about midway between the axial ends thereof. When the pin 38 is engaged between, and is substantially perpendicular to, the flat surfaces 17 and 27, the concave surfaces 19 and 29 are in the proper relative positions for snugly embracing the hose 33.

The cable 46 (FIGURES 3 and 5) has fixed to the free end thereof a swivel head 47 which is larger in diameter than the width of the slot 44. The swivel head 47 has an integral shank 48 of less diameter than both the head 47 and the width of the slot 44. Accordingly, with the shank 48 in the slot 44 and the head 47 inside of the collar 43, the cable 46 and the swivel head fixed thereon can be swiveled together around their own axis, but the head 47 prevents radial outward movement of the cable 46 with respect to the collar 43 since said swivel head is larger in diameter than the width of the slot 44. The central portion of the pivot pin 38 is of sufficient length that the cable 46, which extends outwardly between the upper ends of the clamping members 11 and 12, can be swiveled around its own axis and pivoted both around the axis of the pivot pin 38 and axially thereof around the head 47.

The clamping members 11 and 12 (FIGURE 3) have a pair of bolt openings 51 and 52 which extend through the flat portions 12 and 24 of the metal strips 13 and 23 at corresponding points thereon. The bolt openings 51 and 52 have enlarged portions 53 and 54 in the resilient backing materials 22 and 32. The head 56 of the bolt 57 is disposed within one of the enlarged portions 53 or 54, and a nut 58, which is threadedly engageable with the bolt 57, is disposed within the other of said enlarged portions. The bolt 57 and the nut 58 cooperate to hold the clamping members 11 and 12 against the opposite ends of the pin 38 with the concave surfaces 19 and 29 snugly embracing the hose 33.

The connection between the end portions of the pivot pin 38 and the walls of the recesses 36 and 37 is made sufficiently flexible by the resilient backing material 22 and 32, that some pivoting of the clamping members 11 and 12 with respect to the pivot pin 38 is permitted. This pivotal movement provides a margin of adjustment in the spacing between the concave surfaces 19 and 29 to adapt the connector 10 to hoses 33 of different diameters. The length of the collar 43 is such that the variations in the spacing between the concave surfaces 19 and 29 permitted by the pin 38 will not cause said collar to be pinched between the planar surfaces 17 and 27, whereby its rotation would be obstructed. The cable 46 may, if desired, be connected in a substantially conventional manner to a retrieving device such as a reel, not shown, supported within a structure, such as a gasoline pump, indicated at 59 in FIGURE 1.

*Operation*

The connector 10 (FIGURE 4) can be quickly and easily assembled from its component parts, so that it appears as shown in FIGURE 2. This is accomplished by inserting the shank 48 on the swivel head 47, which has been previously secured to the cable 46, into the slot 44 in the collar 43. The pivot pin 38 (FIGURE 3) is inserted through the collar 43, and its end portions 39 and 40 are urged into the recesses 36 and 37 in the clamping members 11 and 12. At the time that the clamping members 11 and 12 are brought into engagement with the pivot pin 38, their concave surfaces 19 and 29 may be caused to embrace opposite portions of the hose 33. The bolt 57 is inserted through the openings 51 and 52 for engagement with the nut 58 whereby the entire assembly is held firmly together and with respect to the hose 33.

Because the shank 48 (FIGURE 3) is swiveled within the slot 44 and the collar 43 is loosely and pivotally supported upon the pin 38, the cable 46 can be rotated around its own axis and can be pivoted both around the axis of the pin 38 and lengthwise thereof between the flanges 34 and 35. Accordingly, binding and/or crimping of the cable 46 or twisting of the hose 33 during normal operations and use of the hose, as for the purpose of conveying gasoline or another liquid, is avoided. The spacing between the upper ends of the clamping members 11 and 12 is such that even a rigid element, used in place of the cable 46, can pivot substantially freely between positions indicated in broken lines at 46a and 46b in FIGURE 2 without materially obstructing the swivel action of the cable 46. Where the cable 46 is flexible, as is customary, it can assume the position 46c, for example, with ease and without injury to the connector or the cable. Moreover, the cable will be able to swivel and pivot, at least to a limited extent, even when in its broken line position 46c.

Although a particular preferred embodiment of the invention has been disclosed in detail above for illustrative purposes, it will be understood that variations or modifications of such disclosure, which lie within the scope of the appended claims, are fully contemplated.

What is claimed is:

1. A device for effecting a universal connection between a cable and a hose, comprising: a pair of substantially identical clamping members, each clamping member having a substantially planar surface and an adjacent concave surface, each planar surface having a recess therein; a pivot pin having end portions snugly receivable into said recesses, said pin being of greater axial length than the distance between said planar surfaces, whereby said clamping members are spaced from each other; a collar loosely and rotatably encircling said pivot pin between and spaced from said planar surfaces, said collar having a radially disposed opening therethrough; screw means engageable with said members for holding said pin against and between said clamping members; a swivel head engaged with the cable and having a portion of reduced diameter extending through and swiveled within the opening in said collar, said swivel head being disposed within said collar and said cable extending between and beyond said planar surfaces, whereby said cable can be rotated around its own axis and that of said pivot pin.

2. The structure of claim 1 wherein each clamping member is comprised of a metal strip having a flat portion defining said planar surface and an arcuate portion defining said concave surface, the edges of said strip and said sides thereof remote from said planar and concave surfaces being covered with a resiliently flexible material; and wherein said screw means includes a bolt and nut engageable therewith, said clamping members having alignable openings through said planar surfaces through which said bolt is slidably extendable.

3. The structure of claim 1, wherein said opening in said collar is elongated axially of said collar and the distance between said members near said planar surfaces is substantially greater than the diameter of the adjacent portion of the cable, whereby said cable can be pivoted around an axis extending through said collar substantially perpendicularly to the rotational axis of said collar.

4. A device including a universal connection for engaging and supporting a hose, comprising: a pair of similar, elongated clamping members, each clamping member having a first portion near one end thereof with a substantially planar surface and a second portion near the other end thereof with a concave surface adjoining said planar surface, each first portion having a bolt opening extending therethrough in a direction substantially perpendicular to said planar surface, each bolt opening being enlarged at the end thereof remote from its planar surface; a bolt receivable through said bolt openings and having a head receivable into the enlarged end of one of said openings; a nut receivable into the enlarged end of the other bolt opening and engageable with said bolt for holding said members with their planar surfaces in parallel relationship and with their concave surfaces defining a substantially cylindrical wall for snugly embracing the hose; substantially round pivot means mounted upon said first portions of said members and extending between the planar surfaces thereof, said pivot means having engageable end surfaces for limiting the movement of said planar surfaces toward each other; a flange integral with and extending around the side and end edges of said first portion of each member adjacent the planar surface thereof, the flange on one member projecting toward the flange on the other member and being spaced therefrom; a collar encircling and rotatably supported upon said round pivot means between said planar surfaces, said collar having axial end surfaces slidably engageable with said planar surfaces and located radially inwardly of said flanges, whereby said collar can rotate around said pivot means when said bolt and said nut are in their engaged positions, said collar having an inside diameter substantially larger than the outside diameter of said pivot means so that a portion of said collar can be spaced radially from said pivot means to define therewith an arcuate chamber located within said collar between said axial end surfaces thereof, said portion of said collar having a radially extending opening therethrough; and a cable assembly including a cable and a circular swivel head on one end of said cable, said swivel head being of larger diameter than said cable and of larger diameter than the said radial opening in said collar, said swivel head being disposed within said chamber and said cable extending through said radial opening and between said flanges on said members, said cable assembly being rotatable around the lengthwise axis thereof with respect to said collar and said members, and being pivotably movable with said collar around said pivot means and along said flanges.

5. A device for effecting a universal connection between an elongated element and an object, comprising: a pair of similar clamping members, each member having a substantially planar surface and an adjacent concave surface, the planar surfaces being substantially parallel with and spaced from each other and the concave surfaces being adapted to engage and grip said object, the surfaces of said clamping members opposite said planar surfaces being non-metallic; pivot pin means supported upon said clamping members and extending between said planar surfaces, said pivot pin means having axial end surfaces thereon for limiting movement of said planar surfaces toward each other; a collar loosely and rotatably encircling said pivot pin means, said collar being spaced from and located in its entirety between said planar surfaces, said collar having a radially disposed opening therein through which the elongated element extends; connecting means extending between and through the planes defined by said planar surfaces and engaged with said clamping members to limit movement of said planar surfaces away from each other; a swivel head connected to one end of the elongated element, said swivel head being disposed within said collar and having a larger diameter than the minimum dimension across said radially disposed opening in said collar, the swivel head and the elongated element being rotatable around the lengthwise axis of said element with respect to said collar, and the elongated element being spaced from and extending beyond the edges of said planar surfaces, whereby said elongated element is pivotable with said swivel head and said collar around said pivot pin means.

6. A device including a universal connection for engaging and supporting a hose, comprising: a pair of similar, elongated clamping members, each clamping member having a first portion near one end thereof with a substantially planar surface and a second portion near the other end thereof with a concave surface adjoining said planar surface, the first portions of said clamping members having axially aligned and opposed pivot pin openings therein, the axes of said pin openings being perpendicular to said planar surfaces, the surfaces of clamping members opposite said planar surfaces being non-metallic; pivot pin means supported upon said first portions of said members and extending between said planar surfaces, said pivot pin means being receivable into the pivot pin openings in said first portions; screw means associated with said first portions for limiting movement thereof away from each other; a flange integral with and extending around the side and end edges of said first portion of each member adjacent the planar surface thereof, the flange on one member projecting toward the flange on the other member and being spaced therefrom; a pivot member rotatably supported upon said pivot pin means between said planar surfaces, said pivot member having an internal opening through which said pivot pin means extends, said internal opening being of larger size than said pivot pin means radially thereof, thereby providing a space between said pivot pin means and a portion of said pivot member defining said internal opening, said pivot member having external surfaces on opposite sides thereof adjacent to and spaced from said planar surfaces, said external surfaces being located radially inwardly of said flanges, and said pivot member being located substantially entirely within the zone defined between said planar surfaces, whereby said pivot member can rotate around said pivot pin means, said portion of said pivot member having a radially extending opening therethrough communicating with said space; and connector means including an elongated flexible element having a circular swivel head secured to one end thereof, said swivel head being of larger diameter than said elongated element and of larger diameter than the smallest dimension across the radial opening in said pivot member, said swivel head being disposed within said space and said connector means extending through said radial opening and between said flanges on said members, said elongated element being of smaller cross-sectional dimension than the distance between adjacent portions of said flanges, whereby said connector means can pivot between said flanges and around said swivel head, said connector means being rotatable with said swivel head around the lengthwise axis thereof and with respect to said pivot member and said clamping members, said connector means being pivotable with said pivot member around said pivot pin means and thereby along said flanges.

References Cited in the file of this patent
UNITED STATES PATENTS

| | | |
|---|---|---|
| 485,033 | Hanna | Oct. 25, 1892 |
| 1,228,490 | Slasor | June 5, 1917 |
| 2,347,631 | Hotchkiss | Apr. 25, 1944 |